Jan. 12, 1926.  
R. E. MARBURY  
CONDENSER CASING  
Filed August 18, 1921  
1,569,385  
2 Sheets-Sheet 1

WITNESSES:

INVENTOR  
Ralph E. Marbury  
BY  
ATTORNEY

Jan. 12, 1926.

R. E. MARBURY 1,569,385

CONDENSER CASING

Filed August 18, 1921  2 Sheets-Sheet 2

WITNESSES:

INVENTOR
Ralph E. Marbury
BY
ATTORNEY

Patented Jan. 12, 1926.

1,569,385

UNITED STATES PATENT OFFICE.

RALPH E. MARBURY, OF WILKINSBURG, PENNSYLVANIA, ASSIGNOR TO WESTING-HOUSE ELECTRIC & MANUFACTURING COMPANY, A CORPORATION OF PENNSYLVANIA.

CONDENSER CASING.

Application filed August 18, 1921. Serial No. 493,282.

*To all whom it may concern:*

Be it known that I, RALPH E. MARBURY, a citizen of the United States, and a resident of Wilkinsburg, in the county of Allegheny and State of Pennsylvania, have invented a new and useful Improvement in Condenser Casings, of which the following is a specification.

My invention relates to electric condensers, more especially to condensers of the oil-impregnated type used for power-factor correction, it being among the objects thereof to provide a condenser of this type which shall be compact, durable and of simple construction, which shall be leak-proof and in which the condenser elements are maintained under pressure by the structure of the container in which they are assembled.

A further object of this invention is to provide an air-tight condenser tank or container which shall constitute a vacuum chamber for impregnating with oil the assembled condenser elements disposed therein.

Another object of this invention is to provide a condenser having leak-proof terminal joints and bushings.

In my copending application, Serial No. 315,381, filed August 5, 1919, is described a method of forming protective casings for condensers which consists in superimposing alternate layers of foil and insulating material impregnated with a suitable dielectric. The assembled layers are disposed in a casing comprising a box of the approximate dimensions of the condenser desired. A cover of suitable dimensions is provided to fit over the box, and pressure is applied thereto to compress the condenser body. The cover is then secured to the box by soldering, while maintaining the pressure.

The present application is a continuation, in part, of the above identified application.

In practising my invention, I form a substantially rectangular frame by bending a sheet-metal strip and secure the ends thereof in a suitable manner, as by butt or lap welding or by soldering. A plurality of openings are provided in one side of said frame for terminal bushings and a sealing member. A standard condenser, consisting of layers of conductor and dielectric material, is disposed within said frame and secured to suitable terminal bushings. A sheet of insulating material, such as fullerboard, hard fiber, wood or the like, is disposed on each side of said built-up layers, and reinforced sheet metal side covers, having the edges thereof flanged to provide relatively large engaging surfaces, are pressed in said frame to form a complete metal casing or tank and to provide pressure on the assembled structure held therein. The edges of the cover plates are welded or soldered, while still under pressure, to the frame to provide a leak-proof condenser tank.

In the accompanying drawings, constituting parts hereof and in which like reference characters designate like parts, Fig. 1 is a side elevational view, partially in section, of an embodiment of my invention;

Figure 1:
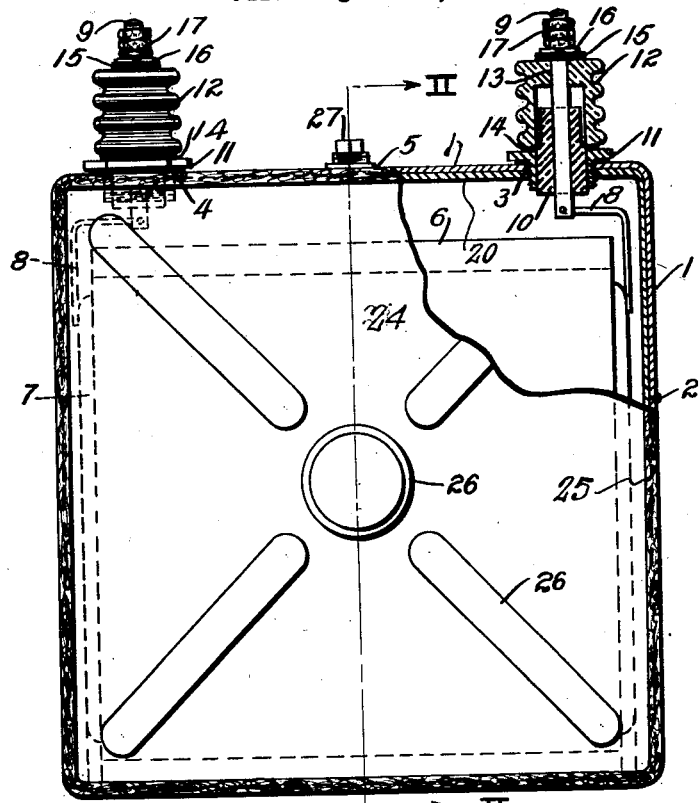
Figure 2:
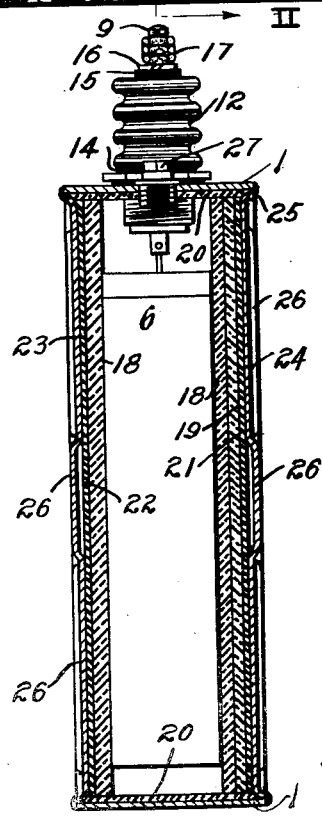
Fig. 2 is a sectional view thereof taken along the line II—II of Fig. 1.

Referring particularly to Figs. 1 and 2, I provide a metallic frame or four-sided tubular member 1 formed into a substantially rectangular shape by bending a strip of sheet metal and secure the ends thereof together, as by a butt weld 2. The frame 1 may be of brass, sheet iron, ingot sheet iron, sheet steel or the like and is provided with a plurality of threaded openings 3, 4, and 5. A condenser body 6, consisting of a plurality of layers of conductor and dielectric sheet materials, is disposed in said frame. The sets of conductors of said condenser body are joined together, as by soldering at 7 and are connected, by soldered leads 8, to terminal rods 9 which are insulated by bushings 10 secured by press fits thereto and securely mounted in threaded base members 11 which are positioned in the openings 3 and 4 of the frame and secured thereto by welding or soldering.

A porcelain insulator 12, having an opening 13 corresponding to the diameter of the rod 9 and a corrugated outer surface, is mounted on the base 11. Felt washers 14 and 15 are provided on the ends of the porcelain insulator 12 to make dust proof joints. A lock washer 16 and nuts 17 are provided to hold the parts together.

To form the side walls of the container, I dispose a plurality of layers of sheet insulating material 18 and 19 of fullerboard, hard fiber or the like, on both sides of the condenser body and a layer 20 of like material on the inner sides of the top and bottom of the frame 1. Sheet-metal plates 21 and 22 are placed on the insulating sheets 19, and reinforced cover plates 23 and 24, having their edges 25 flanged to provide a greater surface for telescopically engaging the frame 1 and having projections 26 formed on the outer surface to strengthen the same, are pressed in said frame to form a complete metal casing or tank and to apply pressure on the assembled structure therebetween.

The edges of the side plates are welded or soldered to the frame 1 to provide a leak-proof tank.

The assembled condenser may be evacuated by connecting the opening 5 to a suitable evacuating device and then filled with a dialectric, such as an insulating oil, to impregnate the condenser element and the sheet insulation. A screw plug 27 is then secured in the threaded opening 5 to seal the tank.

Figure 3:
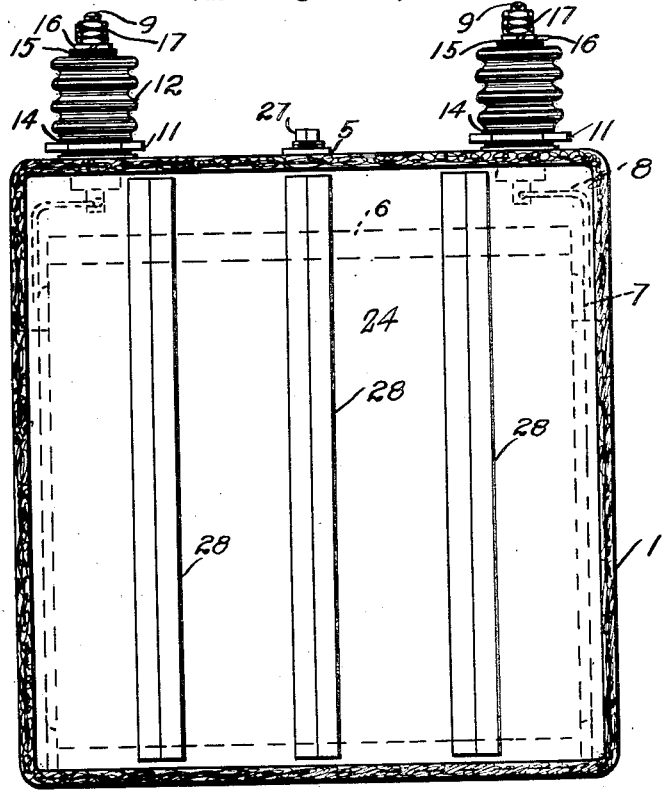
Fig. 3 is a side elevational view of a modified form of my invention.
Figure 4:
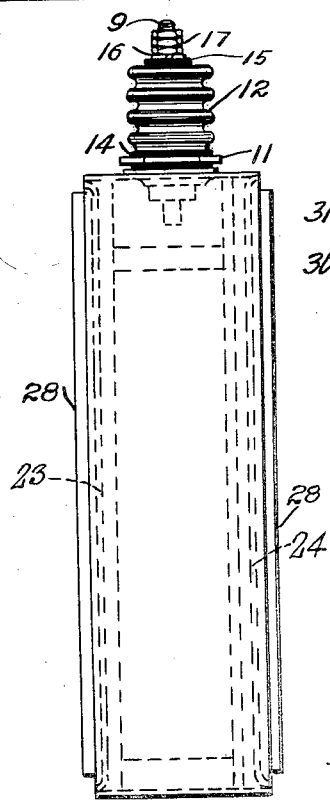
Fig. 4 is an end elevational view of the structure shown in Fig. 3.

In the modification shown in Figs. 3 and 4, the structural parts are substantially as described except that the metallic covers 23 and 24 are reinforced by angle irons 28 which are welded on the outer surface thereof prior to securing the same in position.

Figure 5:
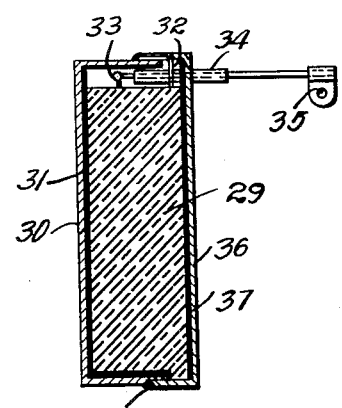
Fig. 5 is a sectional view of a modification of my invention showing a wax-impregnated condenser compressed within a metal casing.

In Fig. 5, a modification of the above-described structure is shown in which the condenser 29 consists of superimposed layers of insulating and conducting material such, for example, as paper and metallic foil. The paper and metallic foil are so cut to form sheets of suitable size which are stacked in layers, and the stacked material is then impregnated with a suitable impregnating agent, such as halowax or Montan wax.

The condenser may also be formed by winding strips of foil and paper in the usual manner. After the condenser has been thoroughly impregnated, it is ordinarily subjected to pressure to compact the stacked material and squeeze out the excess impregnating material. When the condenser is, therefore, in condition for pressing it may be disposed within a suitable box 30 lined with an insulating material 31, such as fish paper. The condenser is, of course, provided with suitable leads 32 and 33, one of the leads 32 being brought into engagement with the box 30 and the other lead 33 being disposed in a suitable insulating sleeve 34 and provided with a terminal 35. A lid or cover 36, which is lined with insulating material 37 and is of suitable dimensions to fit telescopically over the box 30, may be disposed on the condenser 29 and pressure may be applied thereto.

The condenser will, of course, be compressed, and any excess impregnating fluid will flow and tend to fill up any crevices previously unoccupied on account of the slightly greater dimensions of the box 30. While the pressure is maintained upon the cover 36 and, consequently, upon the condenser 29, the cover may be soldered, as indicated at 38, to secure it in place.

It will be seen from the above description of my invention that condensers formed in accordance therewith provide a strong, durable leak-proof structure that is well insulated.

Although I have described several specific embodiments of my invention, it will be obvious to those skilled in the art that various changes may be made in the construction thereof without departing from the principles herein set forth. For instance, any suitable insulating material may be employed to insulate the condenser from the casing, the plates 21 and 22 may be omitted and the condenser-terminal bushings may be of any suitable leak-proof design. The term welded employed in the appended claims includes soldering, brazing, etc. These and other changes in details of construction may be made within the scope of my invention.

I claim as my invention:

1. An electrical apparatus comprising a stack of superimposed layers, and a casing therefor having parts with telescoping sides, said telescoping sides being welded to hold said stack under compression.

2. An electric condenser comprising a stack of alternate layers of conducting and dielectric sheet materials, and a casing therefor having parts with telescoping sides welded together.

3. An electrical apparatus comprising a stack of superimposed layers, and means for serving the double function of tightly enclosing said stack and compressing the same, characterized by the fact that said means comprise a box and lid having telescoping sides which are welded together to provide a casing of any depth necessitated by the thickness of the stack and the amount of compression to be maintained thereon.

In testimony whereof, I have hereunto subscribed my name this 25th day of July 1921.

RALPH E. MARBURY.